(12) United States Patent
Patil et al.

(10) Patent No.: US 8,119,006 B2
(45) Date of Patent: Feb. 21, 2012

(54) ETHANOL STABLE EPOXY AMINE BASED MEMBRANE FOR AROMATICS SEPARATION

(75) Inventors: Abhimanyu O. Patil, Westfield, NJ (US); Timothy D. Shaffer, Hackettstown, NJ (US); David T. Ferrughelli, Flemington, NJ (US); Beth A. Winsett, Houston, TX (US); Benjamin A. McCool, Bonita Springs, FL (US); Randall D. Partridge, Califon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 362 days.

(21) Appl. No.: 12/583,487

(22) Filed: Aug. 21, 2009

(65) Prior Publication Data

US 2010/0059441 A1    Mar. 11, 2010

Related U.S. Application Data

(60) Provisional application No. 61/191,622, filed on Sep. 10, 2008.

(51) Int. Cl.
*B01D 61/36* (2006.01)
*B01D 71/52* (2006.01)
*B01D 71/46* (2006.01)
*B01D 71/00* (2006.01)
*B01D 61/00* (2006.01)

(52) U.S. Cl. ... 210/640; 210/651; 210/652; 210/500.37; 210/500.27; 210/653; 95/45

(58) Field of Classification Search .................... None
See application file for complete search history.

(56) References Cited

U.S. PATENT DOCUMENTS

| | | | |
|---|---|---|---|
| 4,244,817 A * | 1/1981 | Yaginuma | 210/654 |
| 4,929,358 A | 5/1990 | Koenitzer | |
| 4,944,880 A | 7/1990 | Ho et al. | |
| 4,946,594 A | 8/1990 | Thaler et al. | |
| 4,990,275 A | 2/1991 | Ho et al. | |
| 4,997,906 A | 3/1991 | Thaler et al. | |
| 5,320,716 A * | 6/1994 | Akhtar | 521/27 |
| 5,550,199 A | 8/1996 | Ho et al. | |
| 5,670,052 A | 9/1997 | Ho et al. | |
| 5,756,643 A | 5/1998 | Ho et al. | |
| 7,842,124 B2 * | 11/2010 | Partridge et al. | 95/50 |
| 2008/0011680 A1 | 1/2008 | Partridge et al. | |
| 2008/0035557 A1 | 2/2008 | Partridge et al. | |
| 2008/0035573 A1 | 2/2008 | Peiffer et al. | |
| 2008/0035575 A1 | 2/2008 | Partridge et al. | |

FOREIGN PATENT DOCUMENTS

WO    WO 2008/079440 A2    7/2008

* cited by examiner

*Primary Examiner* — Krishnan S Menon
(74) *Attorney, Agent, or Firm* — Paul E. Purwin (57) ABSTRACT

The present invention is directed to a membrane for aromatics separation that is stable in an alcohol containing environment. The polymeric membrane is a epoxy amine based membrane.

10 Claims, 2 Drawing Sheets

ETHANOL STABLE EPOXY AMINE BASED MEMBRANE FOR AROMATICS SEPARATION

This application claims the benefit of U.S. Provisional Application No. 61/191,622 filed Sep. 10, 2008.

FIELD OF THE INVENTION

This invention relates to a polymeric membrane composition that exhibits stability in the presence of alcohol, a method of making the polymeric membrane, and a process for separating components of a hydrocarbon feedstream including hydrocarbon streams containing at least one alcohol utilizing the polymeric membrane. More particularly, but not by way of limitation, this invention relates to the polymeric membrane composition and its use in a process for the separation of aromatics from a hydrocarbon feedstream containing aromatics and aliphatic compounds and at least one alcohol, typically ethanol.

BACKGROUND OF THE INVENTION

Polymeric membrane based separation processes such as reverse osmosis, pervaporation and perstraction are known in the art. In the pervaporation process, a desired feed component, e.g., an aromatic component, of a liquid and/or vapor feed is preferentially absorbed by the membrane. The membrane is typically exposed at one side to a stream comprised of a mixture of liquid feeds, and a vacuum is typically applied to the membrane at the opposite side so that the adsorbed component migrates through the membrane and is removed as a vapor from the opposite side of the membrane via a solution-diffusion mechanism. A concentration gradient driving force is established to selectively pass the desired components through the membrane from its feed or upstream side to its permeate or downstream side.

The perstraction process may also be used to separate a liquid stream into separate products. In this process, the driving mechanism for the separation of the stream into separate products is provided by a concentration gradient exerted across the membrane. Certain components of the fluid will preferentially migrate across the membrane because of the physical and compositional properties of both the membrane and the process fluid, and will be collected on the other side of the membrane as a permeate. Other components of the process fluid will not preferentially migrate across the membrane and will be swept away from the membrane area as a retentate stream. Due to the pressure mechanism of the to perstraction separation, it is not necessary that the permeate be extracted in the vapor phase. Therefore, no vacuum is required on the downstream (permeate) side of the membrane and permeate emerges from the downstream side of the membrane in the liquid phase. Typically, permeate is carried away from the membrane via a swept liquid.

The economic basis for performing such separations is that the two products achieved through this separation process (i.e., retentate and permeate) have a refined value greater than the value of the unseparated feedstream. Membrane technology based separations can provide a cost effective processing alternative for performing the product separation of such feedstreams. Conventional separation processes such as distillation and solvent extraction can be costly to install and operate in comparison with membrane process alternatives. These conventional based processes can require a significant amount of engineering, hardware and construction costs to install and also may require high operational and maintenance costs. Additionally, most of these processes require substantial heating of the process streams to relatively high temperatures in order to separate different components during the processing steps resulting in higher energy costs than are generally required by low-energy membrane separation processes.

A major obstacle to commercial viability of membrane separation technologies, particularly for hydrocarbon feeds, is to improve the flux and selectivity while maintaining or improving the physical integrity of current membrane systems. Additionally, the membrane compositions need to withstand the myriad of applications feed constituents, including alcohols.

Numerous polymeric membrane compositions have been developed over the years. Such compositions include polyurea/urethane membranes (U.S. Pat. No. 4,914,064); polyurethane imide membranes (U.S. Pat. No. 4,929,358); polyester imide copolymer membranes (U.S. Pat. No. 4,946,594); polyimide aliphatic polyester copolymer membranes (U.S. Pat. No. 4,990,275); and diepoxyoctane crosslinked/esterified polyimide/polyadipate copolymer (diepoxyoctane PEI) membranes (U.S. Pat. No. 5,550,199).

Another obstacle is the presence of alcohol in the feedstream, an increasingly frequent issue with government mandates and other incentives for adding alcohols to conventional hydrocarbon based fuels. Conventional polymer membranes suffer from instability in the presence of even small amounts of alcohol in the membrane feedstream. The present invention solves this problem.

Therefore there is a need in the industry for new membrane compositions with improved stability in processing alcohol containing feeds. There is also a need in the industry for new membrane compositions having high flux and selectivity for separating aromatics.

SUMMARY OF THE INVENTION

The present invention relates to a polymeric aromatic selective membrane comprising an epoxy-amine based cross linked polyether, a method of making the polymeric membrane, and a process for separating components of a feedstream utilizing the polymeric membrane. In particular, the polymeric membrane of the present invention may be utilized in a process for selectively separating aromatics from a hydrocarbon feedstream comprised of aromatic and aliphatic hydrocarbons, including feedstreams that contain at least one alcohol, typically ethanol.

In one embodiment, the present invention relates to the composition of a polymeric membrane effective in selectively separating components of a hydrocarbon feedstream. In particular, the present invention relates to the composition of a polymeric membrane effective in the selective separation of aromatics from a hydrocarbon stream containing aromatics and non-aromatics, including feedstreams that contain at least one alcohol. This invention results in a membrane composition with improved membrane physical integrity when used in a alcohol containing environment.

In one embodiment, the present invention relates to a membrane comprising polyethylene oxide ("PEO"), polypropylene oxide ("PPO"), or a combination of PEO and PPO co-polymers reacted with epoxides, and fabricated into thin film membranes.

In a preferred embodiment, the membrane composition is stable for feeds containing twenty percent (20%) or higher alcohol content.

DETAILED DESCRIPTION OF THE PREFERRED EMBODIMENTS

As used herein, the term "hydrocarbon" means an organic compound having a predominantly hydrocarbon character. Accordingly, organic compounds containing one or more non-hydrocarbon radicals (e.g., sulfur or oxygen) would be within the scope of this definition. As used herein, the terms "aromatic hydrocarbon" or "aromatic" means a hydrocarbon-based organic compound containing at least one aromatic ring. The rings may be fused, bridged, or a combination of fused and bridged. In a preferred embodiment, the aromatic species separated from the to hydrocarbon feed contains one or two aromatic rings. The terms "non-aromatic hydrocarbon" or "non-aromatic" or "saturate" means a hydrocarbon-based organic compound having no aromatic cores. The terms "non-aromatics" and "aliphatics" are used interchangeably in this document.

Also as used herein, the terms "thermally cross-linked" or "thermal cross-linking" means a membrane curing process at curing temperatures typically above about 25 to about 400° C. (77 to 572° F.).

Also as used herein, the term "selectivity" means the ratio of the desired component(s) in the permeate to the non-desired component(s) in the permeate divided by the ratio of the desired component(s) in the feedstream to the non-desired component(s) in the feedstream. The term "flux" or "normalized flux" is defined the mass rate of flow of the permeate across a membrane usually in dimensions of Kg/m$^2$-day, Kg/m$^2$-hr, Kg-µm/m$^2$-day, or Kg-µm/m$^2$-hr, g-µm/m$^2$-sec.

Also used herein, the term "selective" means that the described part has a tendency to allow one or more specific components of the feedstream to preferentially pass through that part with respect to the other feedstream components. The selectivity of the membrane of the present invention is greater than abut 3.0, preferably greater than about 4.0, and most preferably greater than about 5.0.

We have found that polyetheramines containing polyethylene oxide (PEO), polypropylene oxide (PPO) or combination of PEO/PPO copolymers can be reacted with epoxides and the material can be fabricated into membranes. The membranes display superior separations performance and show good membrane durability with ethanol and ethanol containing gasoline fuels. Suitable epoxides include tris(4-hydroxyphenoyl)methane triglycidyl ether (CAS 66072-38-6, mp 48-50 C) or poly(bisphenol A-co-epichlorohydrin) and glycidyl end-capped (CAS 25036-25-3) materials. Such epoxides are commercially available with various molecular weights, such as molecular weights of 348, 355, 377, 1075, 1750, 4000, 6100. Suitable polyetheramines can be amine-terminated polyethers. Suitable polyethers include: poly(ethyleneglycol) bis(3-aminopropylether) (molecular weight 1500), poly(propyleneglycol) bis(2-aminopropylether) (molecular weight 230), poly(propyleneglycol) bis(2-aminopropylether) (molecular weight 400), poly(propyleneglycol) bis (2-aminopropylether) (molecular weight 2000), poly (propyleneglycol) bis(2-aminopropylether) (molecular weight 4000), poly(propyleneglycol)-block-poly(ethyleneglycol)-block poly(propyleneglycol) bis(2-aminopropylether) (3.5:8.5) (PO:EO) (molecular weight 600), poly(propyleneglycol)-block-poly(ethyleneglycol)-block poly(propyleneglycol) bis(2-aminopropylether) (3.5:15.5) (PO:EO) (mw 900), poly(propyleneglycol)-block-poly(ethyleneglycol)-block poly(propyleneglycol) bis(2-aminopropylether) (3.5:40.5) (PO:EO) (molecular weight 2000), glycerol tris[poly(propylene glycol), amine terminated] ether (molecular weight 3000 or molecular weight 440), Suitable amine-terminated polyethers that can be used to make the polymers herein include:

Exemplary synthesis routes are described below for epoxy amine polyether membranes.

Suitable polyetheramines are reacted with epoxides, illustrated as follows:

In an alternative embodiment a polyetheramine is reacted with tri-functional epoxides, illustrated as follows:

Suitable expoxides that can be used in the practice of the present invention include: tris(4-hydroxyphenoyl)methane triglycidyl ether (CAS 66072-38-6, mp 48-50 C) or poly (bisphenol A-co-epichlorohydrin), glycidyl end-capped (CAS 25036-25-3) materials. Such epoxides are commercially available with various molecular weights, such as molecular weights of 348, 355, 377, 1075, 1750, 4000, 6100.

In a preferred embodiment, the epoxide comprises Poly (o-cresol glycidyl ether)-co-formaldehyde having a molecular weight of n~540, ~870, ~377, ~1080 or 1270, for example.

Other commercially available epoxides suitable for this invention include 1,2,7,8-diepoxyoctane (with polyether amines), dicyclopentadiene dioxide, 1,5-dicyclooctadiene dioxide, 1,3-butadiene diepoxide, and vinylcyclohexene dioxide, and 4,4'-Methylenebis(N,N-diglycidylaniline). Additionally, suitable epoxies incorporating ether functionality are glycerol digycidyl ether, ethylene glycol diglycidyl ether, diethylene glycol diglycidyl ether, polyethylene glycol diglycidyl ethers (i.e. m.w. 526) and polypropylene glycol diglycidyl ethers of varying molecular weights (i.e. 340, 640).

Epoxides particularly preferred for this invention include 1,2,7,8-diepoxyoctane (with polyether amines), ethylene glycol diglycidyl ether, polyethylene glycol diglycidyl ether (m.w. ~526), polypropylene glycol diglycidyl ether (m.w. ~600), tris(4-hydroxyphenoyl)methane triglycidyl ether, and 4,4'-Methylenebis(N,N-diglycidylaniline), Amines particularly preferred for this invention include poly(propyleneglycol) bis(2-aminopropylether) (m.w. ~400), and poly(propyleneglycol)-block-poly(ethyleneglycol)-block poly(propyleneglycol) bis(2-aminopropylether) (3.5:8.5) (PO:EO) (m.w. ~600) and ethylene diamine (with polyether diglycidyl ethers).

Figure 1:
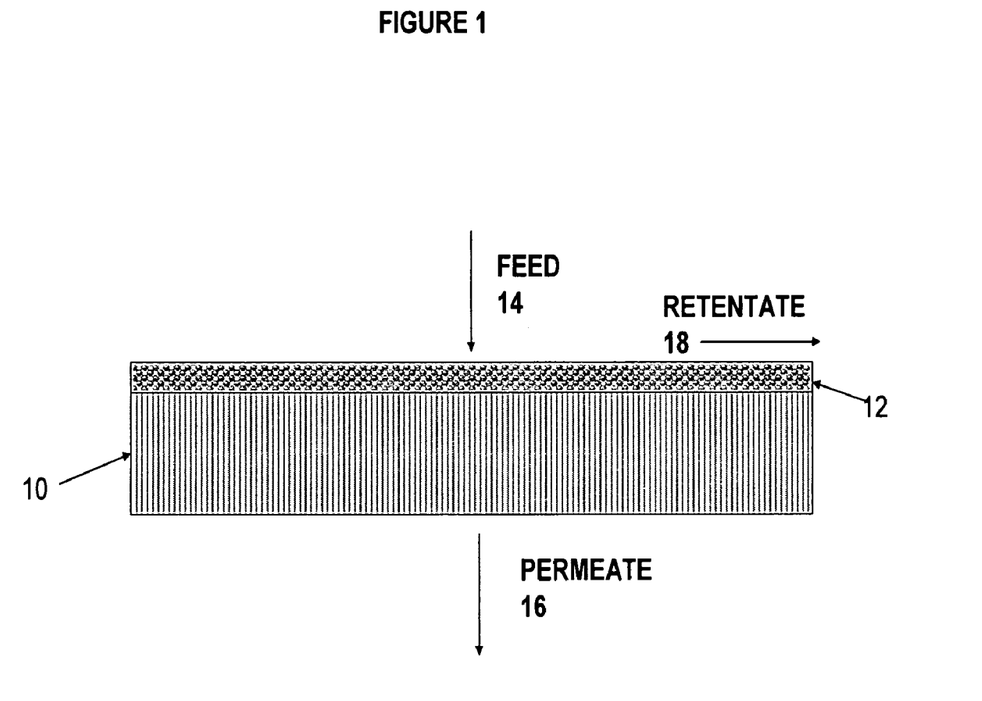
FIG. 1 illustrates a simple embodiment of the present invention.

Process for Making the Epoxy Amine Polyether Membrane:

Referring to FIG. 1, there is illustrated a polymer coated porous substrate membrane system in accordance with the present invention. Though not required in all applications of the present invention, a porous substrate may be used for physical support and enhanced membrane integrity. A substrate (10), here shown as disposed under layer (12), comprises a porous material such as Teflon®, for example. Substrate (10) is characterized as comprising a porous material, suitable for physical support of the polymeric membrane detailed hereinafter. The porosity of the substrate is selected based upon the feed materials that it will be used for separating. That is, the pore size of the substrate is selected to provide little or no impedance to the permeation of the materials that are intended to be the permeate of the overall membrane system. It is also preferred that the ceramic substrate is substantially permeable to hydrocarbon liquid such as gasoline, diesel, and naphtha for example. It is also preferred that the pore size distribution is asymmetric in structure, e.g., a smaller pore size coating is supported on a larger pore size inorganic structure.

Non-limiting examples of supported membrane configurations include casting the membrane onto a support material fabricated from materials such as, but not limited to, porous polytetrafluoroethylene (e.g., Teflon®), aromatic polyamide fibers (e.g., Nomex® and Kevlar®), porous metals, sintered metals, porous ceramics, porous polyester, porous nylon, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides, metal and polymer foams (open-cell and closed-cell foams), silica, porous glass, mesh screens, and combinations thereof. Preferably, the polymeric membrane support is selected from polytetrafluoroethylene, aromatic polyamide fibers, porous metals, sintered metals, porous ceramics, porous polyesters, porous nylons, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides and combinations thereof.

Layer (12) comprises the polymer membrane. There are a number of alternative techniques, known to the skilled practitioner, for fabricating the polymer membrane taught herein. In a preferred embodiment, the polymer membrane may be made by casting a solution of the polymer precursor onto a suitable support, such as porous Gore-Tex® or a microporous ceramic disc or tube, here shown as substrate (10). The solvent is evaporated and the polymer cured by heating to obtain a dense film having a thickness of typically 10 to 100 microns.

The membrane compositions and configurations of the present invention can also be utilized in both unsupported and supported configurations. A non-limiting example of an unsupported membrane configuration includes casting the membrane on a glass plate and subsequently removing it after the chemical cross-linking reaction is completed.

The membrane compositions and configurations of the present invention can be employed in separation processes that employ a membrane in any workable housing configuration such as, but not limited to, flat plate elements, wafer elements, spiral-wound elements, porous monoliths, porous tubes, or hollow fiber elements.

The membranes described herein are useful for separating a selected component or species from a liquid feed, a vapor/liquid feed, or a condensing vapor feeds. The resultant membranes of this invention can be utilized in both perstractive and pervaporative separation processes.

The membranes of this invention are useful for separating a desired species or component from a feedstream, preferably a hydrocarbon feedstream containing at least one alcohol.

In a preferred embodiment, the membrane compositions and configurations above are utilized for the selective separation of aromatics from a hydrocarbon feedstream containing aromatics and non-aromatics and at least one alcohol, typically ethanol.

In another embodiment, the membrane compositions and configurations above are utilized to selectively separate sulfur and nitrogen heteroatoms from a hydrocarbon stream containing sulfur heteroatoms and nitrogen heteroatoms.

In a pervaporative membrane mode, a feed (14) comprising gasoline and optionally containing ethanol, for example, is fed to the membrane (12).

The aromatic constituents of the gasoline feed preferentially adsorb into and migrate through the membrane (12). A vacuum on the permeate (16) side vaporizes the permeate, which has an increased concentration of aromatics (relative to feed (14)).

Membrane separation will preferentially operate at a temperature less than the temperature at which the membrane performance would deteriorate or the membrane would be physically damaged or chemically modified (e.g. oxidation). For hydrocarbon separations, the membrane temperature would preferably range from about 32° F. to about 950° F. (0 to 510° C.), and more preferably from about 75° F. to about 500° F. (24 to 260° C.).

In still another embodiment, the hydrocarbon feedstream is a naphtha with a boiling range of about 80 to about 450° F. (27 to 232° C.), and contains aromatic and non-aromatic hydrocarbons and at least one alcohol. In a preferred embodiment, the aromatic hydrocarbons are separated from the naphtha feedstream. As used herein, the term naphtha includes thermally cracked naphtha, catalytically cracked naphtha, and straight-run naphtha. Naphtha obtained from fluid catalytic cracking processes ("FCC") are particularly preferred due to their high aromatic content.

The feed (14) may be heated from about 50° C. to about 200° C., preferably about 80° C. to about 160° C. While feed (14) may be liquid, vapor, or a combination of liquid and vapor, when feed (14) contacts the membrane (12) it is preferably liquid. Accordingly, the feed side of the membrane may be elevated in pressure from about atmospheric to about 150 psig to selectively maintain at least a portion of the feed contacting the membrane in a liquid form.

The operating pressure (vacuum) ranges in the permeate zone would preferably be from about atmospheric pressure to about 1.0 mm Hg absolute.

In a preferred embodiment, the permeate is condensed into liquid form, then "swept" by a liquid or vapor sweep stream. The permeate dissolves into the sweep stream and is conducted away by sweep stream flow in order to prevent the accumulation of permeate in the permeate zone.

EXAMPLES

The below non-limiting examples identify specific epoxy based polymer membranes that were prepared to illustrate this invention. These membranes were subjected to TGA Testing, Ethanol Stability Testing, and Membrane Pervaporation Testing as described below.

TGA Testing

Single component sorption experiments were performed for these membranes using a thermal gravimetric analyzer (TGA). In this type of experiment polymer films were degassed under flowing helium at 150° C. until reaching a steady weight. The temperature was then lowered to 100° C. and vapor, either toluene or heptane, was introduced at 90% saturation in helium. The mass uptake of the vapor was measured as a function of time until equilibrium was reached. Desorption was achieved by exposing the sample to pure helium at 150° C. until the sample returned to its original weight.

This measurement permits determination of the equilibrium solubility as well as diffusivity of sorbates within a polymer film. When the solubility and diffusivity are known, the ideal selectivity of component A over component B is estimated as the product of solubility and diffusivity of component A divided by the product of solubility and diffusivity of component B. The ideal selectivity determined in this manner can be used as a comparative tool to gauge the potential performance of one polymer over another.

Ethanol Stability Testing

Approximately 150 mg polymer film was mixed with 3 g of ethanol and the mixture was heated in stainless still vessel at 150° C. for 72 hours. At the end of the test, sample was cooled to room temperature and dried in vacuum at 60° C. The weight loss was determined based on difference between initial and final weight of the polymer film.

Membrane Pervaporation Testing

Membranes for pervaporation testing were prepared by casting a solution of the polymer precursor onto a suitable support, such as porous Gore-Tex® or a microporous ceramic disc or tube. The solvent is evaporated and the polymer cured by heating to obtain a dense film having a thickness of typically 10 to 100 microns.

The pervaporation testing was conducted by circulating a preheated feed, typically consisting of a mixture of equal weight fractions of n-heptane and toluene over the membranes. Ethanol at typically 10 wt % is added to this mixture to evaluate ethanol selectivity and additional testing of stability. The membranes were heated to a temperature of 140° C., or as desired, while maintaining pressure of about 80 psig or higher as required to maintain the feed as liquid while applying a vacuum to the opposing side to facilitate pervaporation of the feed components selectively absorbed by the polymer film. The permeate is condensed from vacuum by using a dry ice trap to determine the pervaporation rate or flux and separation selectivity.

The permeate flux rates were calculated and corrected for the polymer thickness, and typically presented as g-microns/s-m2. A sufficient feed rate is maintained to control the yield of permeate to typically less than 1-2% on feed. Aromatic Selectivity is calculated by comparing the aromatic content of the permeate product (AP), with that in the feed, (AF), and normalizing on the Non-aromatic components in the permeate (NP) relative to the feed (NF): (AP/AF)/(NP/NF). Analogous selectivities can be calculated for ethanol and or other feed components.

Example 1

Reaction of poly(bisphenol A-co-epichlorohydrin), glycidyl end-capped diepoxide with poly(propyleneglycol) bis(2-aminopropylether) Jeffamine D-230 polyether amine 0.81 g of poly(propyleneglycol) bis(2-aminopropylether) Jeffamine D-230 polyether amine ($M_n$ 230, 3.5 mmol) and 2 g of poly(bisphenol A-co-epichlorohydrin), glycidyl end-capped ($M_n$ 377, 5.3 mmol) are mixed in 0.5 g of toluene in the mole ratio of 1:51. The solution was poured into aluminum pan and solvent was allowed removed at room temperature over a period of 16 hours. The mixture was heated at 60° C., 100° C. and 140° C. respectively for 2 hour each. The film was then cooled to room temperature and removed from the aluminum pan.

The TGA Testing determined the selectivity of the polymer membrane for toluene and heptane to be 3.65. The Ethanol Stability Testing determined that is the film was intact and lost about 3.79 wt % at 150° C. in 72 hours

Example 2

Reaction of poly(bisphenol A-co-epichlorohydrin), glycidyl end-capped diepoxide with poly(propyleneglycol) bis(2-aminopropylether) Jeffamine D-400 polyether amine 1.41 g of poly(propyleneglycol) bis(2-aminopropylether) Jeffamine D-400 polyether amine ($M_n$ 400, 3.5 mmol) and 2 g of poly(bisphenol A-co-epichlorohydrin), glycidyl end-capped ($M_n$ 377, 5.3 mmol) are mixed in 0.5 g of toluene in the mole ratio of 1:51. The solution was poured into aluminum pan and solvent was allowed removed at room temperature over a period of 16 hours. The mixture was heated at 60° C., 100° C. and 140° C. respectively for 2 hour each. The film was then cooled to room temperature and removed from the aluminum pan.

The TGA Testing determined membrane selectivity of the polymer membrane for toluene and heptane was 5.67. The Ethanol Stability Testing determined that the film was intact and lost 2.77 wt % at 150° C. in 72 hours.

Example 3

Reaction of poly(bisphenol A-co-epichlorohydrin), glycidyl end-capped diepoxide with poly(propyleneglycol) bis(2-aminopropylether) Jeffamine D-2000 polyether amine 3.54 g of poly(propyleneglycol) bis(2-aminopropylether) Jeffamine D-2000 polyether amine ($M_n$ 2000, 1.77 mmol) and 1 g of poly(bisphenol A-co-epichlorohydrin), glycidyl end-capped ($M_n$ 377, 2.65 mmol) are mixed in 0.5 g of toluene in the mole ratio of 1.5. The solution was poured into aluminum pan and solvent was allowed removed at room temperature over a period of 16 hours. The mixture was heated at 60° C., 100° C. and 140° C. respectively for 2 hour each. The is film was then cooled to room temperature and removed from the aluminum pan.

The TGA Testing determined membrane selectivity of the polymer membrane for toluene and heptane was 2.17. The Ethanol Stability Testing of the polymer film determined that the film was intact and lost 9.56 wt % at 150° C. in 72 hours.

Example 4

Reaction of poly(bisphenol A-co-epichlorohydrin), glycidyl end-capped diepoxide with poly(propyleneglycol) bis(2-aminopropylether) Jeffamine D-400 polyether amine 1.06 g of poly(propyleneglycol) bis(2-aminopropylether) Jeffamine D-400 polyether amine ($M_n$ 400, 2.65 mmol) and 2 g of poly(bisphenol A-co-epichlorohydrin), glycidyl end-capped ($M_n$ 377, 5.3 mmol) are mixed in 0.5 g of toluene in the mole ratio of 2.0. The solution was poured into aluminum pan and solvent was allowed removed at room temperature over a period of 16 hours. The mixture was heated at 60° C., 100° C. and 140° C. respectively for 2 hour each. The film was then cooled to room temperature and removed from the aluminum pan.

The TGA Testing determined membrane selectivity of the polymer membrane for toluene and heptane was 9.00.

Example 5

Reaction of tris(4-hydroxyphenyl)methane triglycidyl ether with poly(propyleneglycol) bis(2-aminopropylether) Jeffamine D-2000 polyether amine 7.10 g of poly(propyleneglycol) bis(2-aminopropylether) Jeffamine D-2000 polyether amine ($M_n$ 2000, 5.45 mmol) and 1.09 g of tris(4-hydroxyphenyl)methane triglycidyl ether ($M_n$ 460.53, 15.4 mmol) are mixed in 100 cc round bottom flask and stirred mixed at 60° C. in oil bath to obtain homogeneous viscous solution. The mixture was poured into aluminum pans and heated in vacuum over at 120° C. The films were then cooled to room temperature and removed from the aluminum pan.

The TGA Testing determined selectivity of the polymer membrane for toluene and heptane was 2.16. The Ethanol Stability Test determined that the film was intact and lost 30.5 wt % at 150° C. in 72 hours.

Example 6

Reaction of tris(4-hydroxyphenyl)methane triglycidyl ether with poly(propyleneglycol) bis(2-aminopropylether) Jeffamine D-400 polyether amine 4.06 g of poly(propyleneglycol) bis(2-aminopropylether) Jeffamine D-400 polyether amine ($M_n$ 400, 10.15 mmol) and 3.12 g of tris(4-hydroxyphenyl)methane triglycidyl ether ($M_n$ 460.53, 6.77 mmol) are mixed in 100 cc round bottom flask and stirred mixed at 60° C. in oil bath to obtain homogeneous viscous solution. The mixture was poured into aluminum pans and heated in vacuum over at 60° C. The films were then cooled to room temperature and removed from the aluminum pan.

The TGA Testing determined selectivity of the polymer membrane for toluene and heptane was 3.64. The Ethanol Stability Testing determined that the film was intact and lost 6.4 wt % at 150° C. in 72 hours.

Example 7

Reaction of tris(4-hydroxyphenyl)methane triglycidyl ether with to poly(propyleneglycol) bis(2-aminopropylether) Jeffamine D-400 polyether amine 3.50 g of poly(propyleneglycol) bis(2-aminopropylether) Jeffamine D-400 polyether amine ($M_n$ 400, 8.75 mmol) and 5.37 g of tris(4-hydroxyphenyl)methane triglycidyl ether ($M_n$ 460.53, 11.7 mmol) are mixed in 100 cc round bottom flask and stirred mixed at 60° C. in oil bath to obtain homogeneous viscous solution. 2 g of ethanol solvent was added to the reaction mixture. The mixture was poured on to Gore-Tex® using casting knife set at 10. The film was cured at room temperature overnight, at 60° C. for 16 hours and at 110° C. for 16 hours.

The TGA Testing determined selectivity of the polymer membrane for toluene and heptane selectivity was 4.9. The Ethanol Stability Testing determined that the film was intact and lost 5.3 wt % at 150° C. in 72 hours.

Example 8

Reaction of tris(4-hydroxyphenyl)methane triglycidyl ether with poly(propyleneglycol) bis(2-aminopropylether) Jeffamine D-2000 polyether amine 14.01 g of poly(propyleneglycol) bis(2-aminopropylether) Jeffamine D-2000 polyether amine ($M_n$ 2000, 7.0 mmol) and 4.30 g of tris(4-hydroxyphenyl)methane triglycidyl ether ($M_n$ 460.53, 9.337 mmol) are mixed in 100 cc round bottom flask and stirred mixed at 60° C. in oil bath for 4 hours to obtain homogeneous viscous solution. 2 g of ethanol solvent was added to the reaction mixture. The mixture was poured on to Gore-Tex® using casting knife set at 10. The film was cured at room temperature overnight, at 60° C. for 8 hours and at 110° C. for 8 hours. The films were then cooled to room temperature and removed from the aluminum pan.

The TGA Testing determined selectivity of the polymer membrane for toluene and heptane was 1.9. The Ethanol Stability Testing determined that the film was intact and lost 3.72 wt % at 150° C. in 72 hours.

Example 9

The comparative example of Polyethyleneimide (PEI)

The first step is a condensation polymerization of an oligomeric polyethyleneadipate (PEA) diol and pyromellitic anhydride (PMDA). Typically the condensation reaction involves use of an oligomeric aliphatic polyester (PEA) diol and PMDA in the mole ratio of 1:2 to obtain the anhydride reacted prepolymer. The reaction is generally carried out at 160° C. in 2.5 hours without any solvent under nitrogen atmosphere. In the second step, the prepolymer is dissolved in a suitable polar solvent such as dimethyl formamide (DMF). In the DMF solution, one mole of the prepolymer reacts with one mole of methylene di-o-chloroaniline (MOCA) to make a copolymer containing polyamic acid segment and PEA segment in the chain-extension step. The typical mole ratio of the reagents in this step is 1:1 and the reaction temperature can be lower than room temperature (~15° C. to room temperature). The solvent of the reaction is DMF and additional DMF solvent may be needed to keep the viscosity of the solution low as the viscosity of the solution may increase as a result of a chain-extension reaction. Next set involves reaction of polyamic acid copolymer with diepoxyoctane (DENO). The mole of ratio of the reagent is 1:2 and the reaction can be carried at room temperature for 30-60 minutes.

This epoxy reacted solution can be used to prepare polymer membrane by casting (film coating) the solution onto a porous support (e.g., porous Gore-Tex® teflon) or a glass plate. The thickness can be adjusted by means of a casting knife. The film of the solution from DMF can be prepared and the membrane is dried initially at room temperature and then at higher temperatures (120° C.) and finally cured at much higher temperature (~60° C.). The room temperature reaction may be removing the solvent. The higher temperature (120° C.) may be for the reaction of diepoxide with pendent carboxylic groups. The curing step may convert the polyamide-ester hard segment to the polyimide hard segment via the imide ring closer with the release of alcohol. In the synthesis with PEA, PMDA, MOCA and diepoxide at a molar ratio of 1:2:1:2, the degree of cross-linking for pendent carboxylic acid groups adjacent to the ester linkages between polyimide hard segments and polyester soft segments is 50%. The amounts of the diepoxide used in the cross-linking is 25%. The amounts of the diepoxide resulting in ester alcohol and free alcohol are 50% and 25%, respectively.

polymer and presoaked in the n-heptane/toluene feed for about 10 minutes prior to mounting. A vacuum test confirmed the polymer films integrity, with pressure increasing from 2.4 ton to 6.7 ton over 10 minutes.

n-Heptane/Toluene (50/50 w/w) was fed at 1 cc/min and circulated to a heat exchanger at ~500 cc/min to bring the membrane to an operating temperature of 140° C. at 95 psig, while maintaining a vacuum at pressure of 2-3 torr. After several hours a sample of permeate was collected indicating an initial flux of 2.8 g-microns/s-m2. Analysis of the permeate indicated substantial toluene enrichment leading to an aromatic selectivity of 4.3. The permeate contained 80.8 wt % toluene and 19.2 wt % n-heptane.

After 49 hours the n-heptane/toluene feed at 140° C., the feed was changed to a 10% ethanol blend in n-heptane and toluene (10/45/45 by wt). At 71 hours on stream the flux increased to 20 g-microns/s-m2, while the aromatic selectivity decreased slightly to 3.7. However, the selectivity for total of ethanol and toluene relative to n-heptane increased to 6.9.

The results demonstrate the membrane's ability to selectively separate ethanol and aromatics from non-aromatic aliphatic hydrocarbons by pervaporation.

Figure 2:
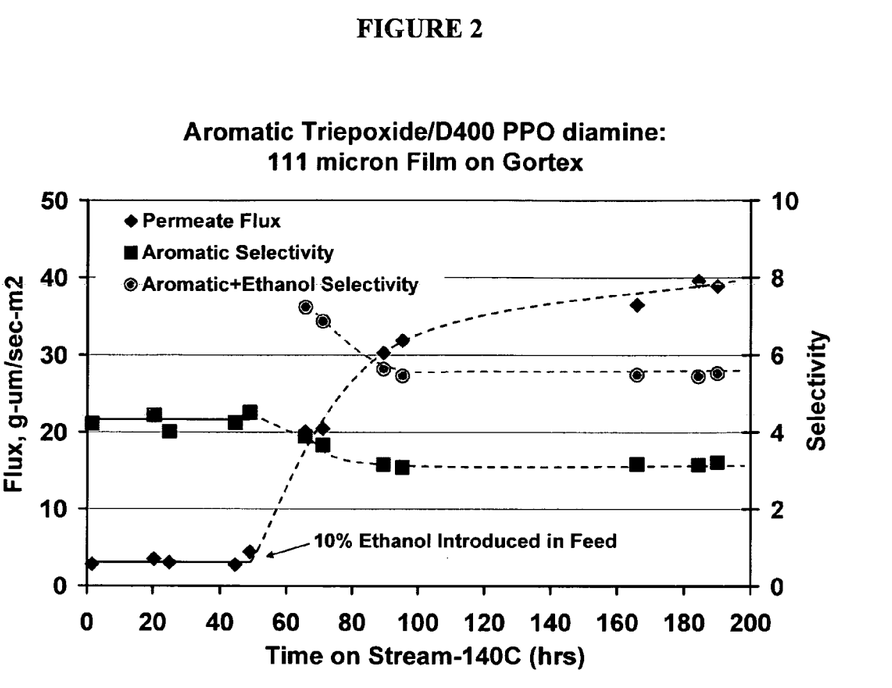
FIG. 2 is a graph that illustrates membrane performance.

The experiment was extended to about 200 hours total time on stream, processing the n-heptane/toluene and ethanol containing feed. Flux increased to slowly, lining out at about 39 g-microns/s-m2, while maintaining adequate flux and selectivity, as shown in FIG. 2. The selectivity for total of ethanol and toluene relative to n-heptane decreased to 5.5 at the higher flux. The permeate composition is substantially Schematic Structure of Polyethyleneimide (PEI) Membrane.

These membranes have exhibited high selectivity and flux for separation of aromatic/saturate mixtures. However, they are not stable in ethanol containing gasoline fuel.

An Ethanol Stability test of the PEI polymer film, determined that the film was completely dissolved with 100% wt loss at 150° C. in 36 hours.

Example 10

Membrane Pervaporation Testing of tris(4-hydroxyphenyl)methane triglycidyl ether with poly(propyleneglycol) bis(2-aminopropylether) Jeffamine D-400 polyether amine A 111 micron thick membrane was prepared by casting the polymer of Example 7 on Gore-Tex® using ethanol solvent. The film was dried overnight in air at ambient room temperature and cured for 8 hours at 80° C., followed by 8 hours at 120° C. (confirm). A 47 mm disc cut from the polymer film was sandwiched by placing a piece of Gore-Tex® over the enriched in ethanol. After lining out, the permeate contained 45.6 wt % ethanol, 41.0 wt % toluene and 13.4 wt % n-heptane. The total ethanol plus toluene in the permeate was 86.6 wt %.

Example 11

Membrane Pervaporation Testing of ethyleneglycol diglycidyl ether with poly(propyleneglycol)-block-poly(ethyleneglycol)-block poly(propyleneglycol) bis(2-aminopropylether) (3.5:8.5) (PO:EO) (molecular weight 600) ED600 Huntsman A membrane polymer precursor of the present invention was prepared by reacting 6.0 g (0.010 moles) of ED600 and 1.74 g (0.010 moles) of EGDGE diluted with 7.74 g ethanol at room temperature for 3 days leading to a noticeable increase in viscosity. ED600 is a poly(propyleneglycol)-block-poly(ethyleneglycol)-block poly(propyleneglycol) bis(2-aminopropylether) (3.5:8.5) (PO:EO) of molecular weight ~600 obtained as a sample from Huntsman Chemical.

EGDGE is a technical grade ethylene glycol diglycidyl ether obtained from Aldrich. A 1.2 g portion of this solution was then combined with 0.35 g solution containing equal amounts of EGDGE and ethanol. The final molar ratio of the diepoxy EGDGE to diamine ED600 was 2.3 and 50% in ethanol.

The ethanolic polymer solution was used to coat a porous ceramic tube (Kyocera) having a microporous gamma alumina coating of nominal porosity 5 nanometers and a surface area of 6.0 cm2. The ethanol was allowed to evaporate at ambient conditions and the polymer was cured by then heating in air from 30° C. to 150° C. at 2° C./minute, and holding at 150° C. for 60 minutes. A thin continuous coating of polymer was observed, with an estimated thickness of 20 microns.

A sample of polymer made from the remaining coating solution, and cured at the same conditions, retained about 80% solids on digestion with ethanol at 150° C. for 3 days.

Pervaporation testing was conducted using conditions as noted in Example 10, but with a coaxial housing for the tube with provision to take permeate from one end of the tube while circulating hot feed along the coated external surface of the tube. Feeds containing 50 wt % toluene and 50 wt % n-heptane (HT) and alternatively 10 wt % ethanol with 45 wt % toluene and 45 wt % n-heptane (E10HT) were used to evaluate the pervaporation. The feed rate was 1 cc/minute and circulated to a heat exchanger at ~800 cc/min to bring the membrane to an operating temperature of 140° C. at 1200 kPa, while maintaining a vacuum at pressure of about 1 kPa.

After lining out and operating on both feeds for total of 558 hours, a sample of permeate was collected at a rate of 1.9 g/hr, indicating a flux of 18 g-microns/s-m2 using the toluene/heptane feed. Aromatic selectivity was 4.0.

Transitioning to the 10% ethanol feed resulted in effectively the same flux. 1.89 g/hr of permeate was collected at 653 hours on stream for a flux of 17.6 g-microns/s-m2. Unexpectedly, the aromatic selectivity improved slightly to 5.0, and the aromatic plus ethanol selectivity was exceptionally high at 9.2.

|  | Feed | | | |
| --- | --- | --- | --- | --- |
|  | HT | E10HT | HT | E10HT |
| Time on Stream, Hours | 171.1 | 221.3 | 557.9 | 653.6 |
| Permeate rate, g/hr | 0.9 | 1.3 | 1.9 | 1.9 |
| Flux, g-um/m2-s | 9.3 | 12.1 | 18.0 | 17.9 |
| Aromatic Selectivity | 3.7 | 4.2 | 4.0 | 5.0 |
| Ethanol + Aromatic Selectivity | n/a | 8.2 | n/a | 9.2 |
| Permeate Composition |  |  |  |  |
| n-Heptane, wt % | 21.6 | 9.1 | 19.8 | 8.2 |
| Toluene, wt % | 78.4 | 38.0 | 80.2 | 41.9 |
| Ethanol, wt % | 0.0 | 52.9 | 0.0 | 49.9 |

As the table illustrates, the composition of the permeate remains similar with each feed over an extended period of time and recovers on changing feeds.

The results obtained with this ceramic supported polyether epoxy membrane clearly demonstrate a high degree of selectivity for aromatics and ethanol, while remaining stable over extended periods of operation. The presence of ethanol in the feed unexpectedly increased aromatic selectivity, while the flux remained similar when transitioning from one feed to the other—very desirable operating traits.

What is claimed is:

1. A process for separating aromatic hydrocarbons from aliphatic hydrocarbons in an alcohol containing hydrocarbon feed comprising:
    a) forming a membrane film comprising the reaction product of a polyetheramine and an epoxide,
    b) contacting a first side of the membrane film with the alcohol containing hydrocarbon feed, said membrane preferentially absorbing aromatic hydrocarbons over aliphatic hydrocarbons,
    c) extracting permeate from a second side of the membrane that is higher in aromatic hydrocarbons than the feed, such that the selectivities of the membrane both for aromatic hydrocarbons versus aliphatic hydrocarbons and for a combination of aromatic hydrocarbons and alcohol versus aliphatic hydrocarbons are each greater than about 3.0.

2. The process of claim 1 wherein said membrane is a polymeric membrane supported by a porous substrate.

3. The process of claim 2 wherein said porous membrane is selected from the group consisting of polytetrafluoroethylene, aromatic polyamide fibers, porous metals, sintered metals, porous ceramics, porous polyester, porous nylon, activated carbon fibers, latex, silicones, silicone rubbers, polyvinylfluoride, polyvinylidenefluoride, polyurethanes, polypropylenes, polyethylenes, polycarbonates, polysulfones, and polyphenylene oxides, metal and polymer foams, silica, porous glass, mesh screens, and combinations thereof.

4. The process of claim 1, wherein the alcohol containing hydrocarbon feed comprises an ethanol containing naphtha or an ethanol containing gasoline.

5. The process of claim 1, wherein the polyetheramine comprises an amine-capped polyethylene oxide, an amine-terminated polypropylene oxide, or a combination thereof.

6. The process of claim 5, wherein the polyetheramine is selected from the group consisting of poly(ethyleneglycol) bis(3-aminopropylether) (molecular weight 1500), poly(propyleneglycol) bis(2-aminopropylether) (molecular weight 230), poly(propyleneglycol) bis(2-aminopropylether) (molecular weight 400), poly(propyleneglycol) bis(2-aminopropylether) (molecular weight 2000), poly(propyleneglycol) bis(2-aminopropylether) (molecular weight 4000), poly(propyleneglycol)-block-poly(ethyleneglycol)-block poly(propyleneglycol) bis(2-aminopropylether) (3.5:8.5) (PO:EO) (molecular weight 600), poly(propyleneglycol)-block-poly(ethyleneglycol)-block poly(propyleneglycol) bis(2-aminopropylether) (3.5:15.5) (PO:EO) (mw 900), poly(propyleneglycol)-block poly (ethyleneglycol)-block poly (propyleneglycol) bis(2-aminopropylether) (3.5:40.5) (PO:EO) (molecular weight 2000), glycerol tris[poly(propylene glycol), amine terminated] ether (molecular weight 3000 or molecular weight 440), and combinations thereof.

7. The process of claim 5, wherein the epoxide is selected from the group consisting of tris(4-hydroxyphenyl)methane triglycidyl ether, poly(bisphenol A-co-epichlorohydrin) glycidyl end capped diepoxide, other commercially available epoxides suitable for this invention include 1,2,7,8-diepoxyoctane, dicyclopentadiene dioxide, 1,5-dicyclooctadiene dioxide,1,3-butadiene diepoxide, vinylcyclohexene dioxide, and combinations thereof.

8. The process of claim 6, wherein the epoxide is selected from the group consisting of tris(4-hydroxyphenyl)methane triglycidyl ether, poly(bisphenol A-co-epichlorohydrin) glycidyl end capped diepoxide, other commercially available epoxides suitable for this invention include 1,2,7,8-diepoxyoctane, dicyclopentadiene dioxide, 1,5-dicyclooctadiene dioxide, 1,3-butadiene diepoxide, vinylcyclohexene dioxide, and combinations thereof.

9. The process of claim 8, wherein the selectivities of the membrane both for aromatic hydrocarbons versus aliphatic hydrocarbons and for a combination of aromatic hydrocarbons and alcohol versus aliphatic hydrocarbons are each greater than about 4.0.

10. The process of claim 8, wherein the selectivities of the membrane both for aromatic hydrocarbons versus aliphatic hydrocarbons and for a combination of aromatic hydrocarbons and alcohol versus aliphatic hydrocarbons are each greater than about 5.0.

\* \* \* \* \*